(12) United States Patent
Zhou et al.

(10) Patent No.: US 9,916,447 B2
(45) Date of Patent: *Mar. 13, 2018

(54) ACTIVE DEFENSE METHOD ON THE BASIS OF CLOUD SECURITY

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Hongyi Zhou, Beijing (CN); Wenbin Zheng, Beijing (CN); He Yu, Beijing (CN); Paul Fan, Beijing (CN)

(73) Assignees: BEIJING QIHOO TECHNOLOGY COMPANY LIMITED, Beijing (CN); QIZHI SOFTWARE (BEIJING) COMPANY LIMITED, Beijing (CN)

( * ) Notice: Subject to any disclaimer, the term of this patent is extended or adjusted under 35 U.S.C. 154(b) by 70 days.

This patent is subject to a terminal disclaimer.

(21) Appl. No.: 14/861,177

(22) Filed: Sep. 22, 2015

(65) Prior Publication Data

US 2016/0012224 A1    Jan. 14, 2016

Related U.S. Application Data

(63) Continuation of application No. 13/817,577, filed as application No. PCT/CN2011/078122 on Aug. 8, 2011, now Pat. No. 9,177,141.

(30) Foreign Application Priority Data

Aug. 18, 2010   (CN) .......................... 2010 1 0256989

(51) Int. Cl.
 *G06F 21/56*   (2013.01)
 *H04L 29/06*   (2006.01)

(52) U.S. Cl.
 CPC ............ *G06F 21/562* (2013.01); *G06F 21/56* (2013.01); *G06F 21/567* (2013.01);
 (Continued)

(58) Field of Classification Search
 CPC .......... G06F 21/00; G06F 21/50; G06F 21/52; G06F 21/53; G06F 21/55; G06F 21/56;
 (Continued)

(56) References Cited

U.S. PATENT DOCUMENTS 6,357,008 B1   3/2002   Nachenberg
6,886,099 B1   4/2005   Smithson et al.
(Continued)

FOREIGN PATENT DOCUMENTS

CN   1900941 A   1/2007
CN   1936910 A   3/2007
(Continued)

OTHER PUBLICATIONS

International Search Report for PCTICN2011/078122.
(Continued)

*Primary Examiner* — Robert Leung
*Assistant Examiner* — Adrian Stoica
(74) *Attorney, Agent, or Firm* — Troutman Sanders LLP

(57) ABSTRACT

The present invention relates to an active defense method based on cloud security comprising: a client collecting and sending a program behavior launched by a program thereon and/or a program feature of the program launching the program behavior to a server; with respect to the program feature and/or the program behavior sent by the client, the server performing an analysis and comparison in its database, making a determination on the program based on the comparison result, and feeding back to the client; based on the feedback determination result, the client deciding whether to intercept the program behavior, terminate execution of the program and/or clean up the program, and restore the system environment. The invention introduces a cloud security architecture, and employs a behavior feature based
(Continued)

on active defense to search and kill a malicious program, thereby ensuring network security.

12 Claims, 4 Drawing Sheets

(52) U.S. Cl.
CPC ........ *H04L 63/145* (2013.01); *H04L 63/1416* (2013.01); *H04L 63/1425* (2013.01); *G06F 2221/033* (2013.01)

(58) Field of Classification Search
CPC .... G06F 21/562; G06F 21/564; G06F 21/566; G06F 21/567; G06F 21/568; H04L 63/00; H04L 63/14; H04L 63/1408; H04L 63/1416; H04L 63/1425; H04L 63/1441; H04L 63/145
See application file for complete search history.

(56) References Cited

U.S. PATENT DOCUMENTS

| | | |
|---|---|---|
| 7,694,150 B1 | 4/2010 | Kirby |
| 8,225,405 B1 | 7/2012 | Peterson et al. |
| 8,266,698 B1 | 9/2012 | Seshardi et al. |
| 8,701,192 B1 | 4/2014 | Glick et al. |
| 2004/0187023 A1 | 9/2004 | Alagna et al. |
| 2007/0028304 A1 | 2/2007 | Brennan |
| 2009/0217377 A1 | 8/2009 | Arbaugh et al. |
| 2009/0282476 A1 | 11/2009 | Nachenberg et al. |
| 2010/0100963 A1 | 4/2010 | Mahaffey |
| 2011/0083186 A1 | 4/2011 | Niemela et al. |
| 2011/0173698 A1 | 7/2011 | Polyakov et al. |

FOREIGN PATENT DOCUMENTS

| | | |
|---|---|---|
| CN | 1936911 | 3/2007 |
| CN | 1936911 A | 3/2007 |
| CN | 101308533 A | 11/2008 |
| CN | 101924762 A | 12/2010 |
| CN | 101593253 A | 4/2012 |

OTHER PUBLICATIONS

Jia, Tiejun, Structure and Features of Intelligent NIPS Based on Cloud Computing, China Management Informationization, 2010, vol. 13, issue 3,Feb. 28, 2010, (Feb. 28, 2010), pp. 112-114.

ACTIVE DEFENSE METHOD ON THE BASIS OF CLOUD SECURITY

CROSS-REFERENCE TO RELATED APPLICATIONS

This application is a continuation of U.S. application Ser. No. 13/817,577, filed Mar. 7, 2013, which is a U.S. national phase application under 35 U.S.C § 371 of International Patent Application No. PCT/CN11/78122, filed Aug. 8, 2011, which in turn claims benefit of priority under 35 U.S.C. § 119 to Chinese Patent Application No. 201010256989.4, filed Aug. 18, 2010. The entireties of all the aforementioned applications are incorporated herein by reference in their entireties.

FIELD OF THE INVENTION

The invention pertains to the field of network security, and in particular, relates to an active defense method based on cloud security.

BACKGROUND OF THE INVENTION

A malicious program is a general term, which refers to any software program deliberately created for performing an unauthorized and usually harmful behavior. A computer virus, a backdoor, a keylogger, a password stealer, a Word and Excel macro virus, a boot sector virus, a script virus (batch, windows shell, java, etc.), a Trojan, a crimeware, a spyware, and an adware, etc. are all some examples which can be called a malicious program.

The traditional ways of defending and killing a malicious program rely mainly on a feature library mode. A feature library consists of feature codes of samples of a malicious program collected by a manufacturer, while a feature code is a segment of program codes similar to "search keywords" truncated by an analysis engineer from where a malicious program is found to be different from a legitimate software. In the course of searching and killing, an engine will read a file and match the file with all of the feature codes "keywords" in the feature library; if a program code of the file is found to be hit, the program of the file may be determined to be a malicious program.

Feature library matching is a very effective technique for searching and killing a known malicious program. However, nowadays in the world the number of malicious programs increases exponentially; because of such an explosive growth, the generation and update of a feature library often lags behind, and most of the time an antivirus software cannot defense and kill endlessly emergent unknown malicious programs.

Active defense came into being as a consequence, which is a real-time protection technique based on a self-analysis and determination on the program behavior, does not take a feature code as the basis for determining a malicious program. Instead, the active defense starts from an original definition and takes directly the program's behavior as the basis for determining a malicious program, wherein ways of using a feature library locally, setting a behavior threshold locally and killing the virus heuristically locally are derived to discriminate and intercept the behavior of the malicious program, thereby to some extent achieving the purpose of protecting a computer of a user.

However, drawbacks inevitably exist for the above local active defense means. First, it is very easy for the local active defense to cause a malicious program to be free to kill. For example, the feature library based defensing and killing mode of the local active defense may be avoided by packing a malicious program or modifying a feature code of the malicious program; for the behavior of the malicious program, the startup upper limit of a behavior threshold based defensing and killing mode is avoided to be triggered by decreasing or replacing associated behaviors performed by a malicious program. Additionally, the local active defense still relies on a timely update of a local database.

SUMMARY OF THE INVENTION

In view of these, the technical problem to be solved by the invention is to provide an active defense method based on cloud security, which does not rely on a local database and leaves the analysis and comparison operation of the active defense to be accomplished on the server.

To solve the above technical problem, the invention discloses an active defense method based on cloud security comprising: a client collecting and sending a program behavior launched by a program thereon and/or a program feature of the program launching the program behavior to a server; with respect to the program feature and/or the program behavior sent by the client, the server performing an analysis and comparison in its database, making a determination on the program based on the comparison result, and feeding back to the client; based on the feedback determination result, the client deciding whether to intercept the program behavior, terminate execution of the program and/or clean up the program, restore the system environment.

Further, the program behavior comprises the program behavior itself and the attributes of the object of the program behavior; the attributes of the object of the program behavior further comprise the black and white level to which the behavioral object itself belongs, the position in the system and type of the behavioral object, the behavior itself made by the behavioral object and the black and white level to which the behavior itself belongs.

Further, the server compares the program feature of the program launching the behavior on a client, which program feature is sent by the client, with feature codes of the blacklist stored in the database, and if hit, determines the program as a malicious program, and feeds back to the client.

Further, the server compares a series of collected program behaviors made by a program on the client with a sequence of identified malicious behaviors stored in the database, accumulates on weight values of the hit program behaviors, compares the accumulated value with a preset threshold, and if the value exceeds the threshold, then determines the program as a malicious program, and feeds back to the corresponding client computer.

Further, the server assigns a corresponding weight value to a respective malicious behavior stored in its database, and the setting of the weight values is obtained according to experiences of the skilled in the art or based on a large amount of collected client data through statistical computation.

Further, the server compares a series of collected program behaviors made by a program on the client with a sequence of identified malicious behaviors stored in the database, accumulates on weight values of the hit program behaviors, compares the accumulated value with a preset threshold, and if the value exceeds the threshold, then performs an analysis on the program, obtains its feature code, compares its feature code with feature codes of the blacklist stored in the database, and if hit, then determines the program as a malicious program, and feeds back to the client.

Further, the step of with respect to the program feature and/or the program behavior, the server performing an analysis and comparison in its database, making a determination on the program based on the comparison result further comprises a step of updating: the server updating in real time or periodically the program feature of the malicious program and/or the behavior of the malicious program into the database for storing.

Further, before the step of the client collecting and sending a behavior of a program and/or a program feature of the program launching the behavior to the server, further comprising: the client collecting and communicating the program feature and the corresponding program behavior thereof to the server; recording in the database on the server different program features and the corresponding program behaviors thereof as well as a black/white list; based on program features and the corresponding program behaviors thereof in an existing known black/white list, performing an analysis on an unknown program feature and program behavior to update the black/white list.

Further, the step of performing an analysis on an unknown program feature and program behavior thereof comprises: if the unknown program feature is identical to a known program feature in the existing black/white list, then including the unknown program feature and the program behavior thereof into the black/white list; if the unknown program behavior is identical or similar to a known program behavior in the existing black/white list, then including the unknown program behavior and the program feature thereof into the black/white list; when a certain program behavior is included into the black/white list, including in the database the program feature corresponding to the program behavior into the black/white list, and also including other program behaviors and program features having an associated relationship with the program behavior into the black/white list; and/or when a certain program feature is included into the black/white list, including in the database the program behavior corresponding to the program feature into the black/white list, and also including other program behaviors and program features having an associated relationship with the program feature into the black/white list.

Further, also comprised are: establishing an associated relationship of behavior and feature among programs having an identical or similar behavior, and based on the associated relationship among the programs having an identical or similar behavior, performing an analysis on an unknown program feature and program behavior to update the black/white list; for a program included into the blacklist in the database, further recording the reverse behavior of the program to perform the reverse behavior when it is confirmed that the program included into the blacklist exists in the client computer; for a program included into the blacklist in the database, based on the behavior of the program, determining the information on an infected file in the client computer, and based on the information on the infected file, downloading a corresponding intact file stored in the database to the client computer to overwrite the infected file; and/or further recording in the database change in number of an identical program feature collected by different client computers within a preset time, and if within a preset time, the increase or decrease in number of a certain unknown program feature collected by different client computers exceeds a threshold, then including in the database the program feature and its corresponding program behavior into the blacklist.

In comparison with the prior solution, the technical effects obtained by the invention are as follows:

The invention introduces a cloud security architecture, wherein all "cloud security" clients are connected in real time with a "cloud security" server, the clients continuously acquire and report updates, a vast malicious program database is constituted on the server, and the analysis and comparison operation of the active defense is left on the server to be accomplished, thereby letting the whole cloud security network be an active defense tool; a program behavior having a threat is collected and stored in the database of the server, and a direct use of the program behavior to perform a determination of a malicious program is supported when performing an analysis on a malicious software on the server.

In addition, also in the invention a program behavior is collected by the client and associated to a program feature, such that the program feature and its corresponding program behavior are recorded in the database, and based on an associated relationship of the collected program behavior and the program feature, an analysis and induction may be performed on a sample in the database, thereby facilitating a classification and discrimination of black and white on a software or program, and also a corresponding cleanup or restoration measure may be formulated for a malicious software in the blacklist.

DETAILED DESCRIPTION OF THE INVENTION

In the following, the implementation of the invention will be described in detail in combination with various illustrations and embodiments, by means of which the implementing process how the invention applies technical means to solve technical problems and achieve technical effects will be fully understood and implemented.

The core concept of the invention lies in that program features, program behaviors and/or program attributes of various programs are collected by a large number of client computers and sent to a server; the server performs an analysis and comparison, makes a determination on the program based on the comparison result, and feeds back to the corresponding client computer; based on the feedback determination result, the client computer decides whether to intercept the program, terminate execution of the program and/or clean up the program, and restore the system environment.

In the following, an active defense mode based on cloud security constituted by a large number of client computers 102 and a server 104 will be described.

Figure 6:
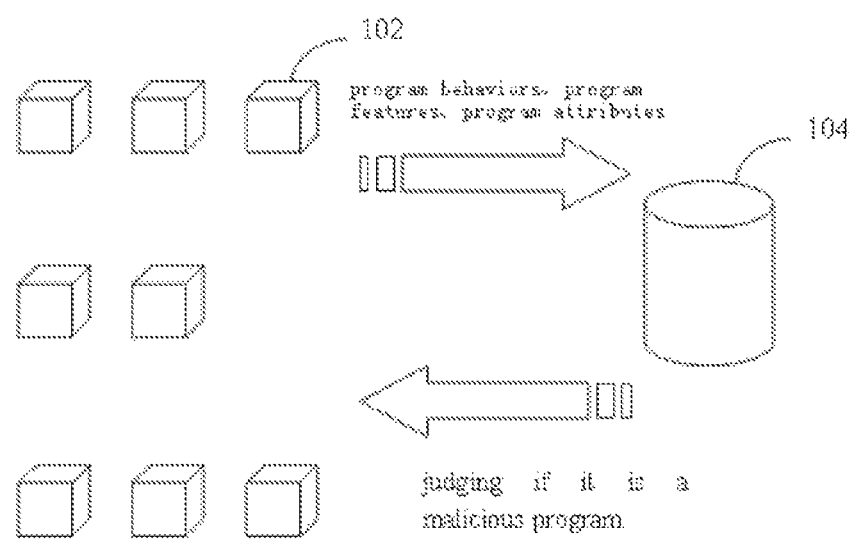
FIG. 6 is a schematic drawing of an implementation mode of the invention.

A cloud structure is a large-scale client/server (CS) architecture, as shown in FIG. 6, which is a schematic drawing of an implementation mode of the invention.

Figure 1:
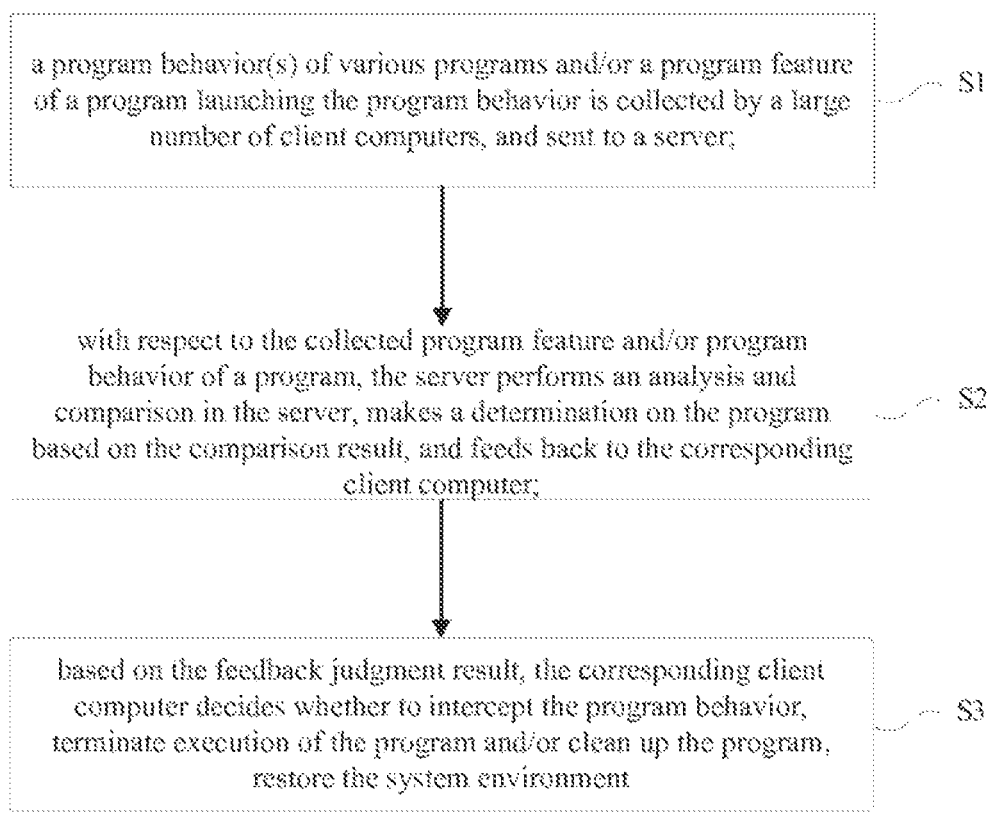
FIG. 1 is a flow chart of an active defense mode based on cloud security of the invention.

Reference is made to FIG. 1, which is a flow chart of an active defense mode based on cloud security of the invention, comprising:

S1, wherein a program behavior(s) (which may be a single behavior, or may be a combination of a set of behaviors) of various programs and/or a program feature of a program launching the program behavior is collected by a large number of client computers, and sent to a server;

S2, wherein with respect to the collected program feature and/or program behavior of a program on each of the client computers, the server performing an analysis and comparison in the server's database, makes a determination on the program based on the comparison result, and feeds back to the corresponding client computer;

S3, wherein based on the feedback determination result, the corresponding client computer decides whether to intercept the program behavior, terminate execution of the program and/or clean up the program, restore the system environment.

The program behavior may be a behavior made directly by a program, or also a behavior not directly made by the program, but a behavior indirectly made by controlling another object program. Therefore, the program behavior comprises the program behavior itself and the attributes of the object of the behavior.

The attributes of the object of the behavior comprise the black and white level (i.e., malicious or non-malicious) to which the behavioral object itself belongs, the position (e.g., in the boot sector, etc.) in the system and type (e.g., such a type as executable file, backup file, etc.) of the behavioral object, and may also be expanded to comprise the black and white level to which the behavior made by the behavioral object belongs, and the behavior itself, etc.

The above program behavior may be, for example, a driver loading behavior, a file generation behavior, a program or code loading behavior, an system startup items adding behavior, or a file or program modification behavior, etc., or a combination of a series of behaviors.

The above program feature may be an MD5 (Message-Digest Algorithm 5) verification code obtained via the MD5 operation, or an SHA1 code, or a CRC (Cyclic Redundancy Check) code etc., which is a feature code that can uniquely identify the original program.

With regard to the step S2, the mechanism in which the server performs an analysis and determination on the program feature(s) and/or program behavior(s) (which may be a single behavior, or may also be a combination of a set of behaviors) of various programs acquired by a large number of client computers may be realized by a combination of one or more of the following ways:

1) the server compares the collected program feature of a program on a client computer with feature codes of the blacklist stored in the database, and if hit, then determines the program as a malicious program, and feeds back to the corresponding client computer;

2) the server compares a series of collected program behaviors made by a program on a client computer with a sequence of identified malicious behaviors stored in the database, accumulates on weight values of the hit program behaviors, compares the accumulated value with a preset threshold (which may be set by the skilled in the art according to experiences thereof), and if the value exceeds the threshold, then determines the program as a malicious program, and feeds back to the corresponding client computer;

Wherein a respective malicious behavior stored in the database is assigned a corresponding weight value, and the setting of the weight values is obtained according to experiences of the skilled in the art or based on a large amount of collected client data through a statistical algorithm.

In the following, the above determination way based on behavior threshold will be explained in detail by an application example. A server collects four program behaviors PA1, PA2, PA3, PA4 of a program A from a client computer, then compares the four program behaviors PA1, PA2, PA3, PA4 with a sequence of malicious behaviors stored in its database. As a result, the program behaviors PA1, PA2, PA3 are hit and PA4 is not hit, which shows that the three program behaviors PA1, PA2, PA3 are malicious.

At this time, the server then accumulates on the malicious program behaviors PA1, PA2, PA3 by weight values preset for the malicious behaviors in the database of the server. For example, assume that the server has preset the weight value of the malicious program behavior PA1 stored in its database to 1, preset the weight value of the malicious program behavior PA2 to 2, and preset the weight value of the malicious program behavior PA3 to 3, thus the accumulated value of the three behaviors is equal to 6. The server compares the accumulated value 6 with its preset behavior threshold. Assume that the behavior threshold has been preset to 5, obviously the accumulated value is greater than the behavior threshold, and therefore it can be determined that the program A performing the above program behaviors PA1, PA2, PA3 is a malicious program.

Assume that various malicious behaviors stored in the database comprise: deleting the registry startup items or services, terminating the process of a computer security program tool, weak password cracking the administrator accounts of other computers on the local area network and reproducing and transmitting, modifying key values of a registry resulting that hidden files and system files cannot be viewed, trying to damage files under a hard disk partition, deleting system backup files of a user, etc. For these malicious behaviors, the extent of their damage or the severity may be determined according to the experiences of the skilled in the art, and thus a greater weight value is assigned to a malicious behavior with a high damage extent or severity; furthermore, a mathematical model may be established according to a series of parameters such as report frequency, damage range, etc. of a malicious program behavior by a large amount of collected client data, and weights of various malicious behaviors may be obtained by a statistical algorithm and weight values are allocated.

3) the server compares a series of collected program behaviors made by a program on a client computer with a sequence of identified malicious behaviors stored in the database, accumulates on weight values of the hit program behaviors, compares the accumulated value with a preset threshold, and if the value exceeds the threshold, then performs an analysis on the program, obtains its feature code, compares its feature code with feature codes of the blacklist stored in the database, and if hit, then determines the program as a malicious program, and feeds back to the corresponding client computer.

Here, the procedure of determination based on a behavior threshold is identical to that in way 2), and the difference from that in way 2) lies in that it does not determines directly a malicious program by the determination on the behavior threshold, but screens out programs by the determination on the behavior threshold and then performs a feature code detection, thereby determining a malicious program.

In the above mechanism of determination and analysis, once the above program is determined as a malicious program, the server updates in real time or periodically the program feature and/or the malicious behavior of the malicious program into the database for storing.

Under the premise that the client computers reach a certain number, the server may update the database on the server in a very short time by a large number of acquisitions and reports of the client computers.

The update of the database of the server will be discussed in detail in the section of construction and dynamic maintenance of a sample database.

In the following, the construction and dynamic maintenance of the database on the server will be described.

Figure 2:
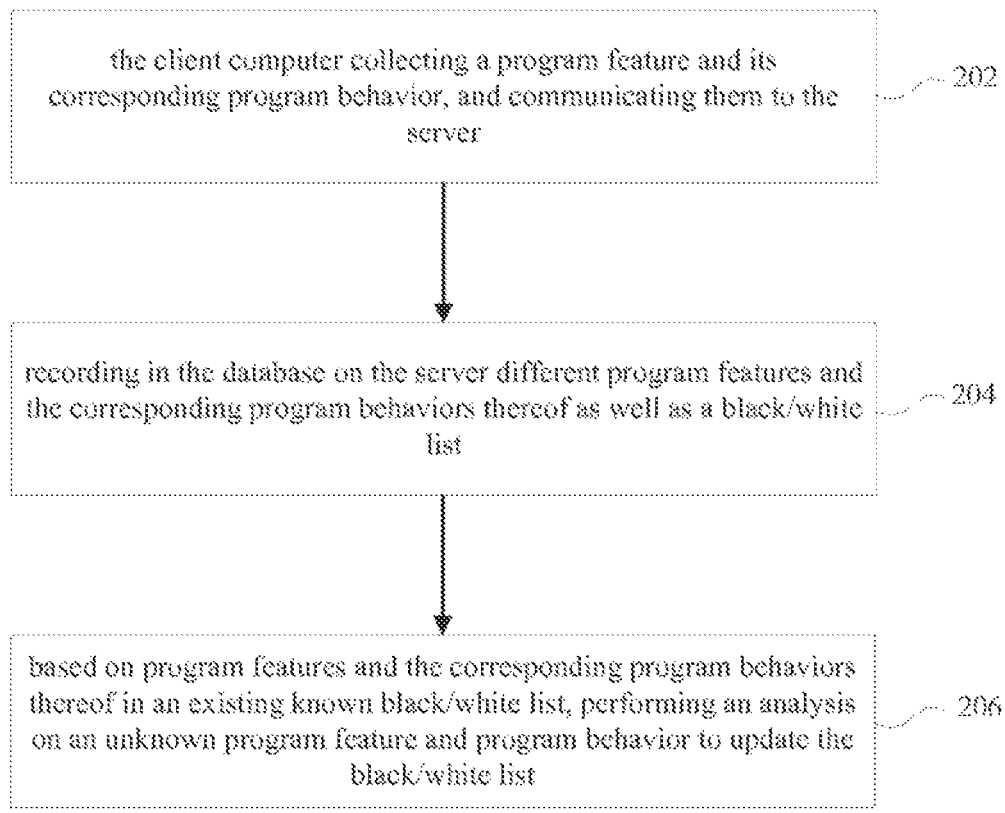
FIG. 2 is a flow chart of a cloud based dynamic maintenance method for a sample database according to an embodiment of the invention.

As shown in FIG. 2, FIG. 2 is a flow chart of a cloud based dynamic maintenance method for a sample database according to an embodiment of the invention. First, the client computer collects a program feature and its corresponding program behavior, and communicates them to the server (step 202); then, recording in the database on the server different program features and the corresponding program behaviors thereof as well as a black/white list (step 204); based on program features and the corresponding program behaviors thereof in an existing known black/white list, an analysis is performed on an unknown program feature and program behavior to update the black/white list (step 206).

Since a program feature and a behavior record corresponding to the feature are recorded in the database, an unknown program may be analyzed in combination with the known black/white list.

For example, if an unknown program feature is identical to a known program feature in the existing black/white list, then the unknown program feature and the program behavior thereof are included into the black/white list.

If an unknown program behavior is identical or similar to a known program behavior in the existing black/white list, then the unknown program behavior and the program feature thereof are included into the black/white list.

Since some malicious programs may change the feature codes by such a technique as variation or packing, etc., but there is not a great change in their behaviors, it may be conveniently determined whether some unknown programs are a malicious program or not by a comparative analysis on the program behavior records. Such a comparative analysis sometimes need not perform a trace and analysis on the behavior itself of a program, and it is only necessary to simply perform a comparison with known program behaviors in the existing black/white list to be able to determine the nature of an unknown program.

Through the analysis of records in the database, it can be found that for some programs the behaviors are identical or similar, but the program features are different. At this point, as long as an associated relationship of behavior and feature is established among the programs having identical or similar behaviors, based on such an associated relationship, an analysis may be performed conveniently on an unknown program feature and program behavior to update the black/white list.

Figure 3:
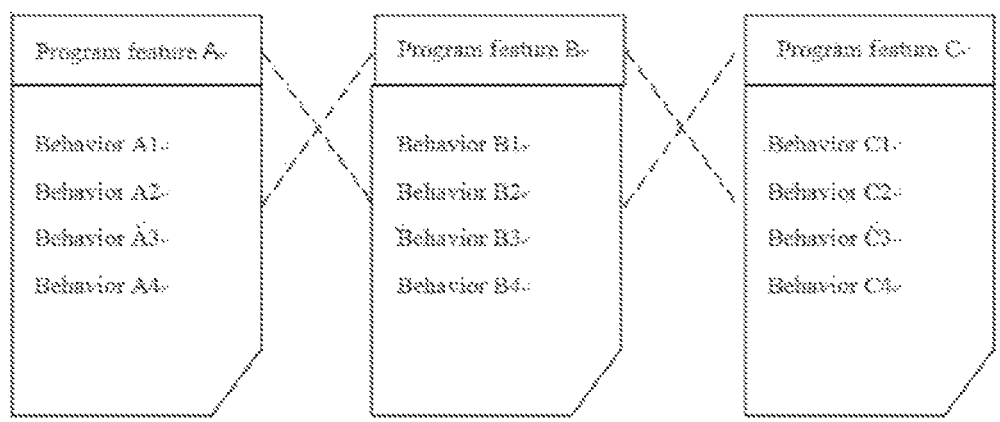
FIG. 3 is a schematic drawing of an associated relationship according to an embodiment of the invention.

As shown in FIG. 3, FIG. 3 is a schematic drawing of an associated relationship according to an embodiment of the invention. Assume that the features of unknown programs A, B, and C are A, B, and C, respectively, and their respective corresponding program behaviors are A1.about.A4, B1.about.B4, C1.about.C4. If after an analysis it is found that the program behaviors A1.about.A4, B1.about.B4, C1.about.C4 are substantially identical or very similar, then an associated relationship of feature and behavior may be established between the features A, B, and C and the behaviors A1.about.A4, B1.about.B4, C1.about.C4.

Through such an associated relationship, the database may be maintained more conveniently and self-expandingly under some conditions. For example, when the program behaviors B1.about.B4 of the program B are confirmed as malicious program behaviors and included into the blacklist, the program feature B corresponding to the program behavior may be automatically included into the blacklist in the database, and at the same time, also the program behaviors A1.about.A4, C1.about.C4 having an associated relationship with the program behaviors B1.about.B4 and the corresponding program features A, C may be automatically included into the black/white list according to the associated relationship.

For another example, if initially the programs A, B, and C all belong to black and white unknown programs, and the program feature B is first confirmed as a feature belonging to a malicious program via other search and kill approaches for a malicious program, then not only a combination of the behaviors B1.about.B4 may be automatically included into the blacklist in the database, but also the features A and C having identical or similar behaviors may be included into the blacklist and the program behaviors A1.about.A4, C1.about.C4 may be included into the blacklist according to the associated relationship.

In the invention, since a behavior corresponding to a program feature is recorded in the database, this results in providing a great convenience to analysis of a behavior of unknown program. For example, when interest is focused on the behavior of loading a driver, all program behaviors with a driver loading behavior may be called to be comprehensively analyzed, and if in a template with a driver loading behavior in the blacklist, the driver loading is usually followed by a special file generation behavior, then a program behavior likewise with a similar behavior combination in an unknown program should be included in risk prompts or directly included into the blacklist.

The above analysis method of the invention is not limited thereto, and methods similar to decision tree, Bayesian algorithm, neural network computation, etc., or the simple threshold analysis, may be well applied on the basis of the database of the invention.

In addition, for a program included into the blacklist in the database, the reverse behavior of the program may be further recorded to perform the reverse behavior when it is confirmed that the program included into the blacklist exists in the client computer.

For example, based on the information collected from the foreground, after a certain program is found to be a malicious program according to cloud search and kill or other ways like feature code way, a restoration action may be performed according to the recorded reverse behavior.

Figure 4:
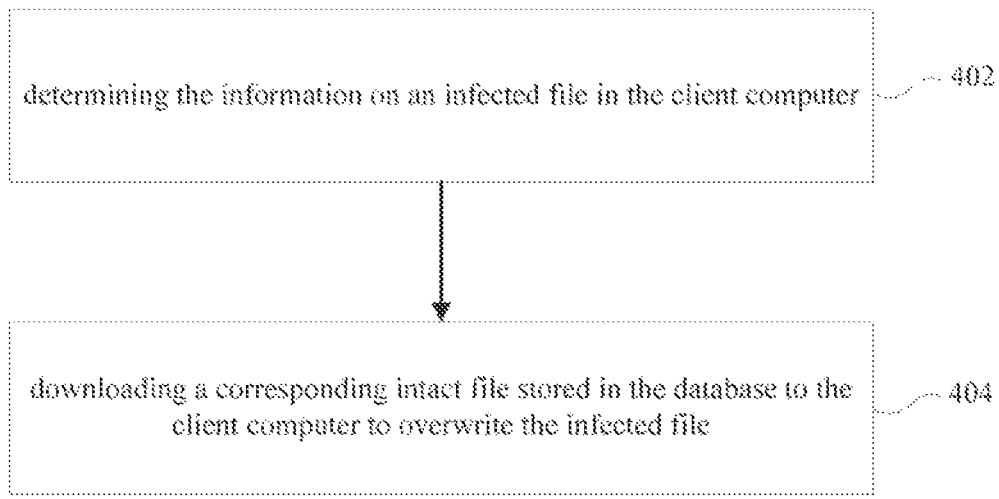
FIG. 4 is a flow chart of file restoration according to an embodiment of the invention.

For some files which can not be restored by performing a reverse behavior, they may be restored by way of replacement. As shown in FIG. 4, FIG. 4 is a flow chart of file restoration according to an embodiment of the invention. First, for a program included into the blacklist in the database, based on the behavior of the program, the information on an infected file in the client computer is determined (step 402); and then based on the information on the infected file, a corresponding intact file stored in the database is downloaded to the client computer to overwrite the infected file (step 404).

For the obtaining of the information on the infected file, it may be queried and determined in the database by information such as the file path, system version, associated application components, etc.

Figure 5:
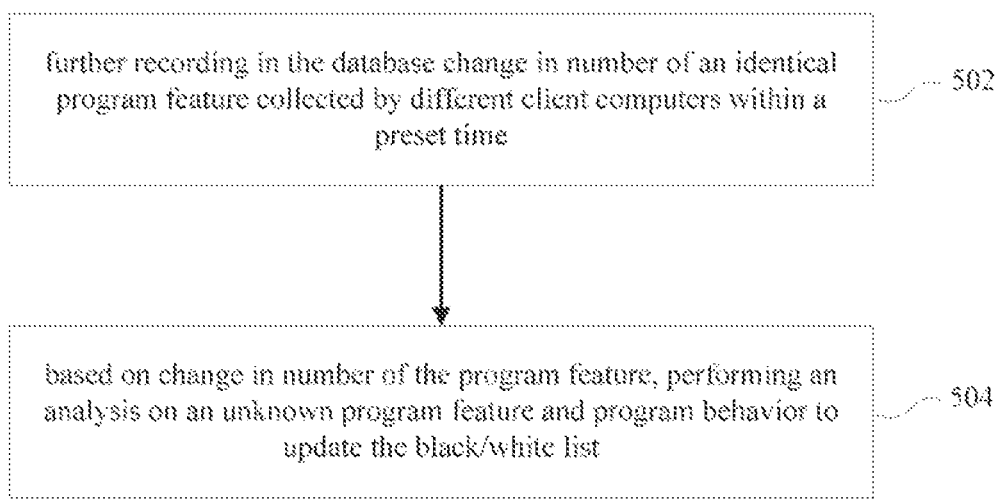
FIG. 5 is a schematic drawing of a flow chart of an analysis according to an embodiment of the invention.

In addition, since in the invention associated information is recorded in the database in a way of utilizing a large number of client computers to collect a program behavior and program feature, the attributes of a program may be determined by monitoring and analyzing the propagation speed of the program in a short term. Reference is made to FIG. 5, which is a schematic drawing of a flow chart of an analysis according to an embodiment of the invention. First, in the database further recording change in number of an identical program feature collected by different client computers within a preset time (step 502); and then based on change in number of the program feature, an analysis is performed on an unknown program feature and program behavior to update the black/white list (step 504).

For example, if within a preset time, the increase or decrease in number of a certain unknown program feature collected by different client computers exceeds a threshold, then the program feature and its corresponding program behavior are included into the blacklist in the database.

With such a way, information on a program acquired by the foreground is communicated to a background server cluster. If the program is a Trojan program, but it no longer does any propagation, then it is a quiet dead Trojan and at this time the Trojan may be considered as having no threat. However, if the Trojan propagates to a new machine, it may be perceived soon by utilizing the invention, since the client computer will also report to the server. When 100, 500, or 1,000 machines report, in the database of the server the collected information on increase in number will be counted and analyzed and fed back. If in a very short time the increase in number of the program exceeds a threshold, or many variant programs arise having similar behaviors to the behavior of the program, an analysis and determination may be automatically performed utilizing the invention; once the determination is completed, the program may be included into the blacklist; and the blacklist of the database may also be updated dynamically and self-expandingly, which greatly improves the efficiency of the database maintenance and the program analysis.

The above description shows and describes several preferred embodiments of the invention, however, as previously mentioned, it is to be understood that the invention is not limited to the form disclosed herein, should not be regarded as an exclusion of other embodiments, but may be applied in various other combinations, modifications and environments, and may be altered according to the above teachings or techniques or knowledge in a related art within the scope of the inventive concepts herein. And as long as the alterations and variations made by the skilled in the art do not depart from the spirit and scope of the invention, they all should fall within the protection scope of the appended claims of the invention.

The invention claimed is:

1. A server, comprising:
   one or more processors;
   one or more memories having program instructions stored thereon that are executable by the one or more processors to cause the server to perform the operations comprising:
   recording a black/white list in a database, which black/white list including different program features and corresponding program behaviors;
   receiving at least one of a program behavior and a program feature of a first program from a client;
   comparing the received program feature/program behavior with the recorded program feature/program behavior in the database, and making a determination on the first program based on the comparison result;
   feeding back the determination result to the client;
   wherein, when the comparison result indicates that the program behavior of the first program is included into the black/white list, the black/white list is updated by:
      adding a program feature of the first program that corresponds to the program behavior of the first program to the black/white list, and
      adding a program behavior and a program feature of a second program into the black/white list based on an associated relationship between the first program and the second program; and/or
   when the comparison result indicates that the program feature of the first program is included into the black/white list, the black/white list is updated by:
      adding a program behavior of the first program that corresponds to the program feature of the first program to the black/white list, and
      adding the program behavior and the program feature of the second program to the black/white list based on the associated relationship between the first program and the second program.

2. The server of claim 1, wherein the program behavior comprises the program behavior itself and the attributes of the object of the program behavior; the attributes of the object of the program behavior further comprise the black and white level to which the behavioral object itself belongs, the position in the system and type of the behavioral object, the behavior itself made by the behavioral object and the black and white level to which the behavior itself belongs.

3. The server of claim 1, wherein the operation of comparing the received program feature/program behavior and the recorded program feature/program behavior in a database and making a determination on the program based on the comparison result comprising
   comparing the received program feature of the program with the feature codes in the blacklist stored in the database, and if hit, determining the program as a malicious program.

4. The server of claim 2 wherein the operation of comparing the received program feature/program behavior and the recorded program feature/program behavior in a database and making a determination on the program based on the comparison result comprising
   comparing a series of received program behaviors of the program with a sequence of identified malicious behaviors in the blacklist stored in the database, accumulating on weight values of the hit program behaviors, comparing the accumulated value with a preset threshold, and if the value exceeds the threshold, then determining the program as a malicious program.

5. The server of claim 4, wherein assigning a corresponding weight value to a respective malicious behavior stored in the database, and the setting of the weight values is obtained according to experiences of the skilled in the art or based on a large amount of collected client data through statistical computation.

6. The server of claim 2, wherein the operation of comparing the received program feature/program behavior and the recorded program feature/program behavior in a database and making a determination on the program based on the comparison result comprising comparing a series of received program behaviors of the program with a sequence of identified malicious behaviors in the blacklist stored in the database, accumulating on weight values of the hit program behaviors, comparing the accumulated value with a preset threshold, and if the value exceeds the threshold, then analyzing on the program, obtaining its feature code, comparing its feature code with feature codes of the blacklist stored in the database, and if hit, then determining the program as a malicious program.

7. The server of claim 3, wherein the operation of comparing the received program feature/program behavior and the recorded program feature/program behavior in a database and making a determination on the program based on the comparison result further comprising a step of updating:
updating in real time or periodically at least one of a program feature of the malicious program and a program behavior of the malicious program into the blacklist in the database for storing.

8. The server of claim 1, wherein the operations further comprising
for a program included into the blacklist in the database, further recording the reverse behavior of the program to perform the reverse behavior when it is confirmed that the program included into the blacklist exists in the client computer; and/or
for a program included into the blacklist in the database, based on the behavior of the program, determining the information on an infected file in the client computer, and based on the information on the infected file, downloading a corresponding intact file stored in the database to the client computer to overwrite the infected file; and/or
further recording in the database change in number of an identical program feature collected by different client computers within a preset time, and if within a preset time, the increase or decrease in number of a certain unknown program feature collected by different client computers exceeds a threshold, then including in the database the program feature and its corresponding program behavior into the blacklist.

9. A client computer, comprising:
one or more processors,
one or more memories having program instructions stored thereon that are executable by the one or more processors to cause the client computer to perform the operations comprising:
collecting a program feature and/or a program behavior of a first program;
sending the collected program feature and/or program behavior to a server;
receiving a determination result from the server, and deciding how to handle the first program based on the determination result;
wherein the determination result is made by the serve based on a comparison of the program feature/program behavior of the first program and a black/white list, and
when the comparison indicates that the program behavior of the first program is included in the black/white list, the black/white list is updated by:
adding a program feature of the first program that corresponds to the program behavior of the first program to the black/white list, and
adding a program behavior and a program feature of a second program into the black/white list based on an associated relationship between the first program and the second program; and/or
when the comparison indicates that the program feature of the first program is included in the black/white list, the black/white list is updated by:
adding a program behavior of the first program that corresponds to the program feature of the first program to the black/white list, and
adding the program behavior and the program feature of the second program to the black/white list based on the associated relationship between the first program and the second program.

10. The client computer of claim 9, wherein
the determination result comprising whether the first program is a malicious program.

11. The client computer of claim 9, wherein the operation of deciding how to handle the first program based on the determination result comprising:
deciding whether to intercept the program behavior, terminate execution of the first program and/or clean up the first program, restore the system environment.

12. An active defense method based on cloud security, comprising:
recording a black/white list in a database, which black/white list including different program features and corresponding program behaviors;
receiving at least one of a program behavior and a program feature of a first program from a client;
comparing the received program feature/program behavior with the recorded program feature/program behavior in the database, and making a determination on the first program based on the comparison result;
feeding back the determination result to the client;
wherein, when the comparison result indicates that the program behavior of a first program is included in the black/white list, the black/white list is updated by:
adding a program feature of the first program that corresponds to the program behavior of the first program to the black/white list, and
adding a program behavior and a program feature of a second program into the black/white list based on an associated relationship between the first program and the second program; and/or
when the comparison result indicates that the program feature of the first program is included in the black/white list, the black/white list is updated by:
adding a program behavior of the first program that corresponds to the program feature of the first program to the black/white list, and
adding the program behavior and the program feature of the second program to the black/white list based on the associated relationship between the first program and the second program.

* * * * *